(12) United States Patent
Weihl et al.

(10) Patent No.: US 8,387,205 B2
(45) Date of Patent: Mar. 5, 2013

(54) BLOWER APPARATUS WITH RELEASABLE MOUNT AND DIRECTION CONTROL

(75) Inventors: Ricky A. Weihl, Muskegon, MI (US); James H. Schultz, Muskegon, MI (US)

(73) Assignee: Mow-Blo, LLC, Muskegon, MI (US)

( * ) Notice: Subject to any disclaimer, the term of this patent is extended or adjusted under 35 U.S.C. 154(b) by 959 days.

(21) Appl. No.: 12/422,583

(22) Filed: Apr. 13, 2009

(65) Prior Publication Data

US 2010/0257694 A1   Oct. 14, 2010

(51) Int. Cl.
   *A47L 9/00*   (2006.01)
(52) U.S. Cl. ............................................ 15/347; 15/405
(58) Field of Classification Search .................... 15/405, 15/347, 331, 328, 330, 322, 200.1
   See application file for complete search history.

(56) References Cited

U.S. PATENT DOCUMENTS

| | | |
|---|---|---|
| 2,180,269 A | 11/1939 | Wisher |
| 3,441,089 A | 4/1969 | Minton |
| 3,776,459 A | 12/1973 | Bonvicini |
| 3,857,515 A | 12/1974 | Zennie |
| 3,959,846 A | 6/1976 | Yasuda |
| 4,194,346 A | 3/1980 | Ingalls |
| 4,318,267 A | 3/1982 | Green |
| 4,700,534 A | 10/1987 | Reilly |
| 5,279,102 A | 1/1994 | Foster |
| 5,694,752 A | 12/1997 | Warfield, III |
| 5,746,045 A * | 5/1998 | Haney ............................. 56/13.3 |
| 6,009,595 A | 1/2000 | Leasure et al. |
| 6,050,069 A | 4/2000 | Elensky |
| 6,185,917 B1 | 2/2001 | Goudes |
| 6,226,833 B1 | 5/2001 | Kawaguchi et al. |
| 6,766,560 B2 | 7/2004 | Murphy et al. |
| 7,086,616 B2 | 8/2006 | Murphy et al. |
| 7,219,488 B2 * | 5/2007 | Hatfield ........................ 56/13.6 |
| 7,240,891 B2 | 7/2007 | Hafendorfer |
| 2003/0221399 A1 | 12/2003 | Hall |
| 2005/0132531 A1 | 6/2005 | Haberlein |

* cited by examiner

*Primary Examiner* — Robert Scruggs
(74) *Attorney, Agent, or Firm* — Price Heneveld LLP (57) ABSTRACT

A blower assembly is releasably attached to a lawnmower frame by quick-release mounting system comprising a down-facing blade and up-facing receiving pocket that frictionally stably vertically engage. The blower assembly includes a blower unit, a flexible hose with an outlet for emitting a directed air flow, adjustment structure for adjustably supporting the flexible hose in different vertical and horizontal positions and orientations, and powered actuators operably connected to the adjustment structure to selectively bend the flexible hose. A powered control automatically controls the actuators for automatically operating the actuators to move the outlet to a selected position and orientation. Related methods include removing and reconnecting the blower assembly to different lawnmowers and lawn care wheeled devices.

25 Claims, 11 Drawing Sheets

BLOWER APPARATUS WITH RELEASABLE MOUNT AND DIRECTION CONTROL

BACKGROUND

The present invention relates to blowers for lawn care, and more particularly relates to a blower apparatus releasably attached to a lawnmower and which has powered direction control of its air outlet. However, the present apparatus is not believed to be limited to only lawnmowers, nor lawn care.

Commercial and residential lawn care providers often use blowers to finish their work, such as to blow grass clippings off driveways, sidewalks, and curbs and into waste areas, and such as to blow leaves and debris into desired areas (or off desired areas). However, blowing requires extra people, time and/or equipment. Notably, the lawn care industry is very competitive, and the above people/time/equipment are not inexpensive. Often equipment is purchased that is good for particular tasks, but that is not flexible enough to do various tasks efficiently and quickly. For example, where a particular blower has a fixed outlet, the air stream may be at a "wrong" height or poor angle for optimal blowing. Further, where a blower is fixedly attached to a particularly large lawnmower, a medium-sized yard that needs "blowing" cleanup but not grass cutting may not justify starting up the large lawnmower only for the simple task of blowing. Also, most equipment is not able to allow multiple tasks to be done at once (such as mowing a lawn and while at the same time also blowing grass clippings)

Haney U.S. Pat. No. 5,746,045 discloses a blower fixedly attached to a lawnmower, where the blower's outlet air stream is directed to spread grass clippings. However, in Haney, the blower's outlet is fixed, such that it is not able to redirect its stream of air in different directions, as is sometimes needed in order to optimally and efficiently do different blower tasks. For example, a direction and height of air flow may be important (and different) when blowing grass clipping off a driveway or over a curb, or when blowing leaves to clean a maximum width strip (i.e., in order to reduce the number of back-and-forth trips required for blowing off a lawn or driveway). Further, Haney's blower is fixed and not easily removable, such that it essentially remains part of the lawnmower. Thus, a blower must be purchased by the lawn care company for each lawnmower where it may be desirable to spread grass clippings coming out of the lawnmower. This adds considerably to the business's capital expense. Also, since it is not efficient to remove a blower from a lawnmower in the field, a separate hand-carried blower must be purchased in order to use the blower without the lawnmower.

It is known to attach a flexible hose to the outlet of a blower, and also to manually redirect the air flow in desired directions. For example, see Yasuda U.S. Pat. No. 3,959,846, Bonvicini U.S. Pat. No. 3,776,459, Kawaguchi U.S. Pat. No. 6,226,833 and Murphy U.S. Pat. No. 7,086,616. However, manual adjustment can be difficult, particularly where the equipment is heavy and/or large enough in size to require considerable effort to move/flex the air flow hose and to bend the air flow hose against a straightening force of the air flowing within it. Further, it is desirable to hold the air flow hose in a selected position without the physical effort of continuing to hold the hose in a selected position. Still further, for stand-on lawnmowers and riding lawnmowers of significant size, it is desirable to have the operator continuously keep both hands on the lawnmower controls . . . and not force the operator to have at least one hand on the air hose repositioning device . . . and further not to distract the operator into continuing to focus on a direction/orientation of the air hose. Removable mounts are known for blowers. For example, see Hafendorder U.S. Pat. No. 7,240,891, Reilly U.S. Pat. No. 4,700,534, Haberlein Publication No. U.S. 2005/0132531, and Green U.S. Pat. No. 4,318,267. However, they require multiple fasteners and time consuming connection/disconnection, and are not as flexible as desired . . . such that they do not allow quick removal and re-mounting to different lawnmowers and support carriers . . . so that one blower can be used on multiple lawn mowing apparatus.

SUMMARY OF THE PRESENT INVENTION

In one aspect of the present invention, a lawn care apparatus includes a self-powered wheeled vehicle having a frame, and a blower assembly attached to the frame. The blower assembly includes a blower unit, a flexible hose with an outlet for emitting a directed flow of air from the blower unit, adjustment structure configured to support the flexible hose in different vertical and horizontal positions and orientations, and at least one powered actuator operably connected to the adjustment structure to selectively bend the flexible hose. A control is operably connected to the at least one actuator, the control having different positions for automatically operating the at least one actuator to move the outlet to a selected one of the positions and orientations.

In narrower forms, the control includes two switches (e.g., one up/down, one right/left switch), two actuators (up/down and right/left), powered adjustment (e.g., a pivot, linear rack of teeth, powered pinion gear, or pivot, arcuate rack of teeth, powered pinion), and is self-contained including pluggable electrical connections. Also, the flexible hose is supported by structure including shock absorber, is movable to different positions include straight sideways, straight forward. The blower assembly includes detachable mounting structure, releasably engageable without use of separate fasteners, and which includes connectors that wedgingly vertically engage, and which is supported by a telescopingly extendable arm for adjustable width positioning.

In another aspect of the present invention, a lawn care apparatus includes a wheeled vehicle having a main frame, a blower assembly including a subframe, and a mounting system. The mounting system includes a laterally-facing female connector on one of the main frame and subframe, and a laterally-facing male connector on the other of the main frame and the subframe. The female and male connectors include mating side edges that stably engage to hold the blower assembly in a fixed position on the wheeled vehicle.

In a narrower form, the female and male connectors face and engage vertically.

In a narrower form, the side edges of the female and male connectors are angled to wedgingly engage.

In another aspect of the present invention, a blower apparatus adapted for attachment to a lawn care apparatus includes a blower assembly having a blower unit with a subframe, a flexible hose with an outlet for emitting a directed flow of air from the blower unit, adjustment structure configured to support the flexible hose in different vertical and horizontal positions and orientations relative to the subframe, and at least one powered actuator operably connected to the adjustment structure to selectively bend the flexible hose. A control is operably connected to the at least one actuator. The control has different positions for automatically operating the at least one actuator to move the outlet to a selected one of the positions and orientations.

In another aspect of the present invention, a method for providing lawn care includes providing a lawnmower and a second wheeled device each having a first connector, and providing a blower assembly having a second connector shaped to matably releasably engage the first connector. The method includes removing the blower assembly from the lawnmower by disconnecting the second connector from the first connector on the lawnmower, and re-attaching the blower assembly to the wheeled device by connecting the second connector with the first connector on the wheeled device.

An object of the present invention is to provide a blower system with directional control that is able to be automatically adjusted for optimal blowing angle, such as to blow clippings off or over a curb, or blow debris across a parking lot, or to blow leaves and clippings into dense vegetation near a lawn, or etc.

An object of the present invention is to orient a blown stream of air for distributing clumps of grass clippings without repeated trips across a same area.

An object of the present invention is to provide one piece of equipment that can mow and also blow grass clippings, without the need to go back to a trailer after mowing, in order to get a blower or other second piece of equipment.

An object of the present invention is to provide a blower that can be removed without the need for removing separate fasteners, and without the inefficiencies associated with having to remove separate fasteners.

An object of the present invention is to provide a blower that can be removed without the need for tools, and without the inefficiencies associated with having to have tools available and also having to use tools to remove the blower unit from a supporting wheeled device.

These and other aspects, objects, and features of the present invention will be understood and appreciated by those skilled in the art upon studying the following specification, claims, and appended drawings.

DETAILED DESCRIPTION OF PREFERRED EMBODIMENTS

Figure 1:
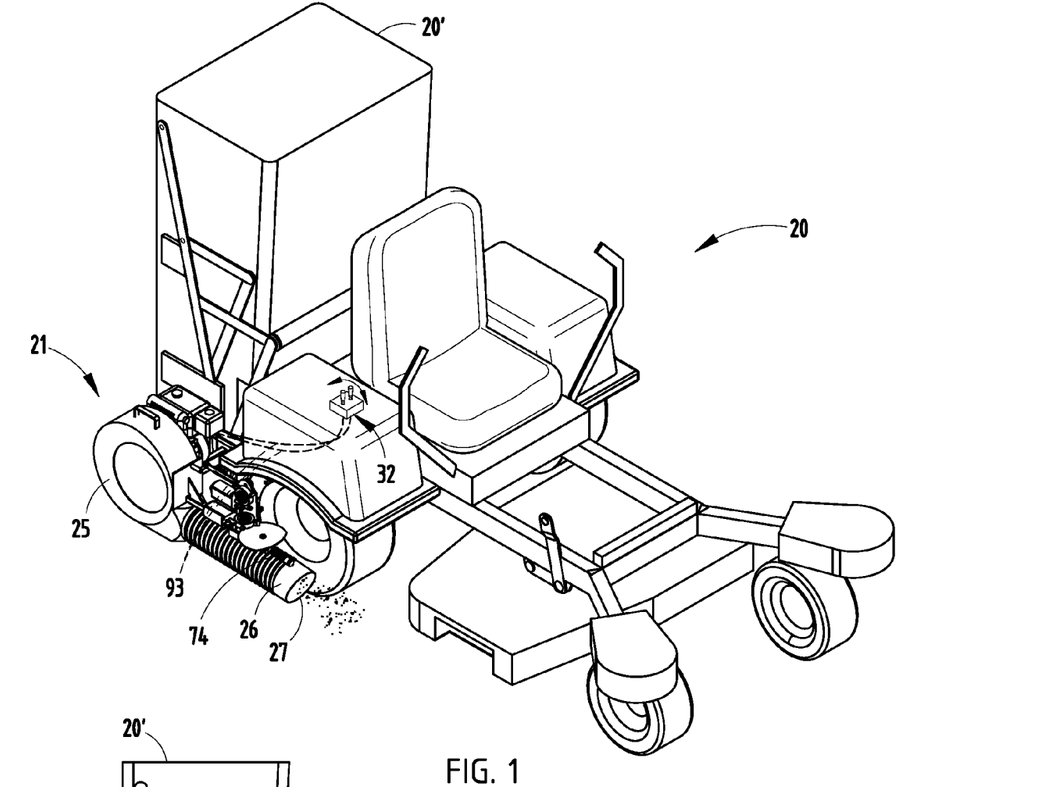
FIGS. 1-2 are perspective and side views of a lawnmower with a blower assembly attached.
Figure 2:
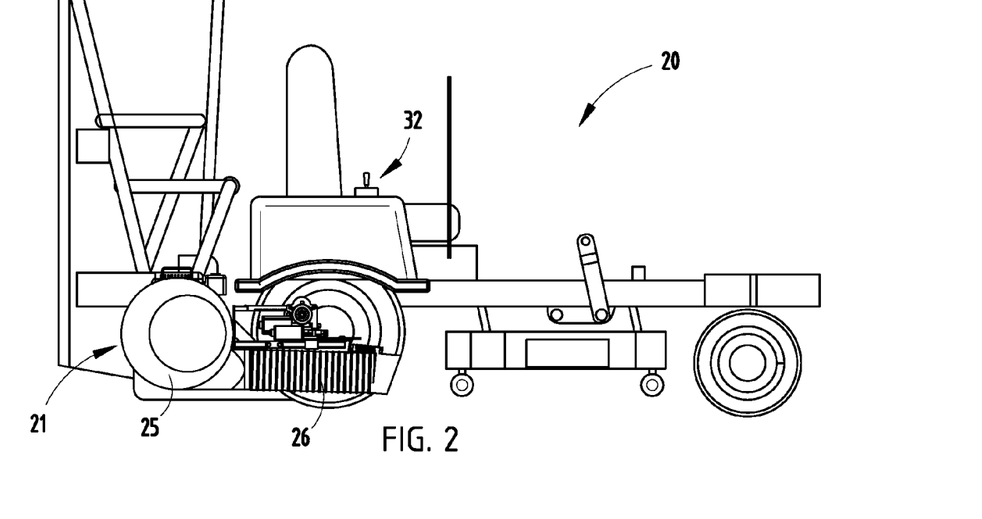
Figure 3:
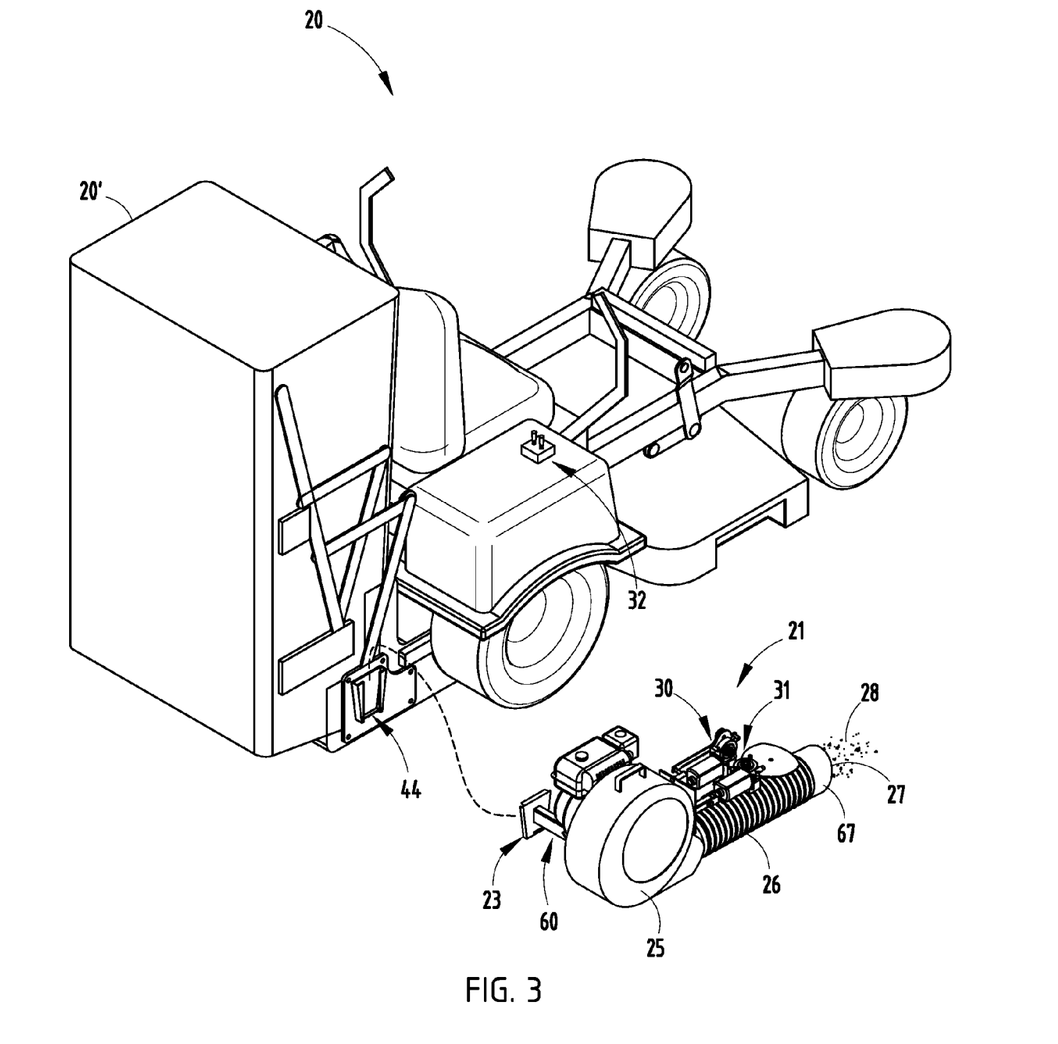
FIG. 3 is a perspective view of FIG. 1 with the blower assembly exploded away.

A lawnmower 20 (FIG. 1) includes a blower assembly 21 releasably attached to the lawnmower frame 22 by a quick-release mounting system comprising a down-facing blade connector 23 (FIG. 3) and up-facing receiving pocket connector 24 that frictionally wedgingly stably engage in a vertical direction. Notably, the illustrated lawnmower 20 includes a grass/debris collection bag 20', which can be (and is often) removed when using the blower assembly 21. The blower assembly 21 is an independent self-powered unit that includes a blower unit 25, a flexible hose 26 with an outlet 27 for emitting a directed air flow 28, automatic adjustment structure 29 for adjustably supporting the flexible hose 26 in different vertical and horizontal positions and orientations (see FIGS. 12, 14, 17, 20), and powered actuators 30 and 31 operably connected to the adjustment structure 29 to selectively automatically bend the flexible hose 26 in a desired orientation. A powered control 32 includes switches for automatically controlling the actuators 30 and 31 for automatically operating the actuators 30 and 31 to move and orient the outlet 27 to a selected position and vertical/horizontal orientation and then hold the new orientation. Related methods include removing and reconnecting the blower assembly 21 to different lawnmowers and lawn care wheeled devices, without the need to remove separate fasteners.

The present lawnmower 20 (FIG. 1) is a rider and has mounted on its frame 22 a seat, motor, fuel tank, steering, battery, electrical system, mowing deck and blade, controls, and the like. Many such lawnmowers are known, including ride-on (sit-on, stand-on), walk-behind, push, and the like), and it is contemplated that the present blower assembly 21 can be mounted to a variety of such different mowers 20, including stand-on, ride/sit-on, walk-behind, and push varieties.

Figure 5:
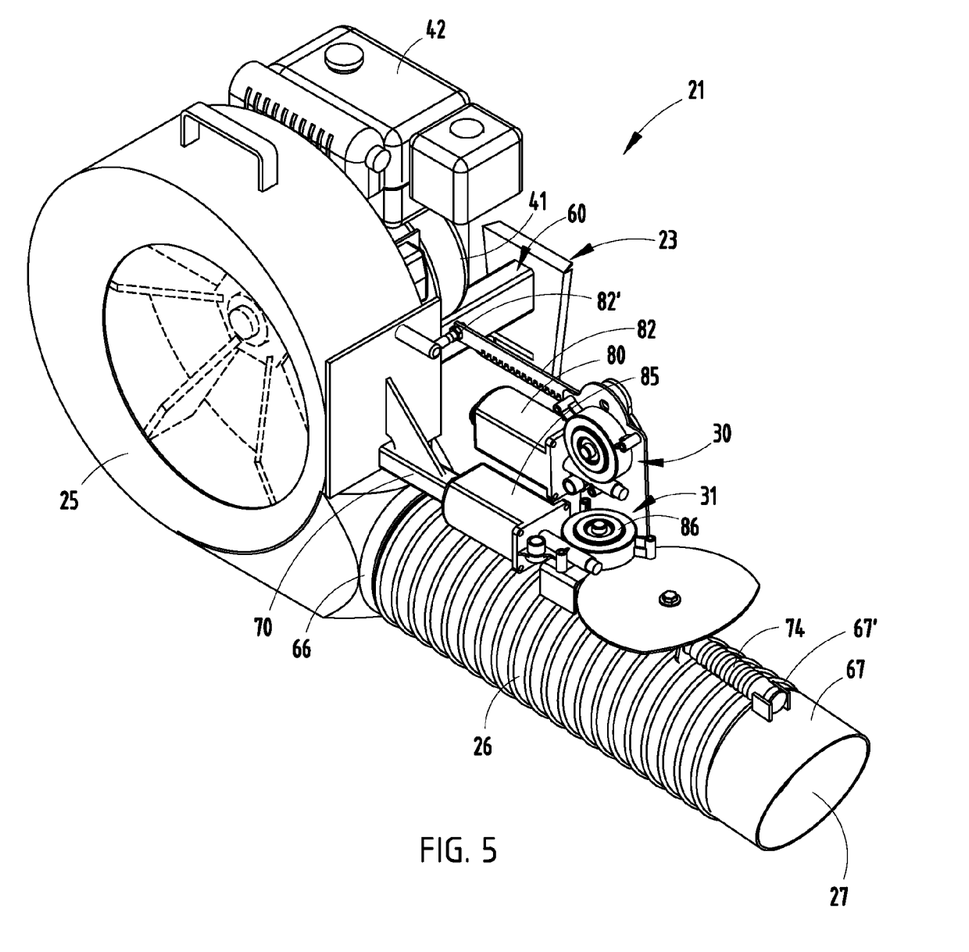
FIGS. 5-9 are perspective, top, bottom, front and rear views of the blower assembly of FIG. 3.
Figure 6:
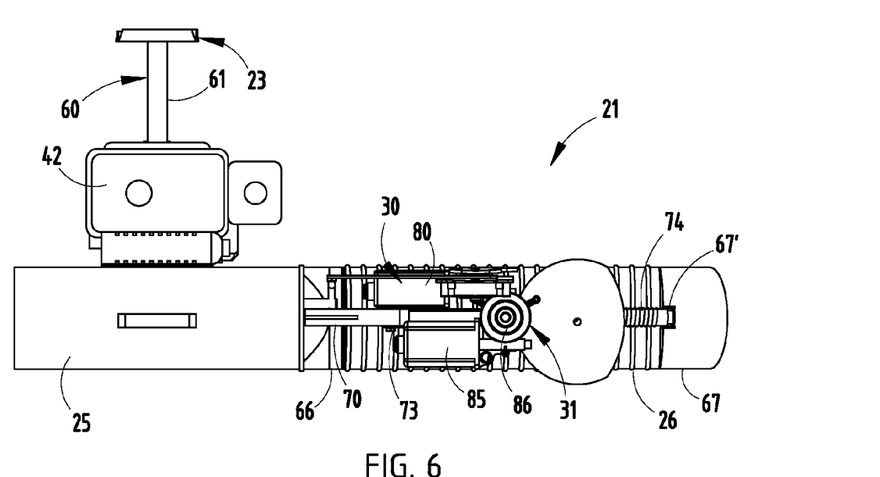
Figure 7:
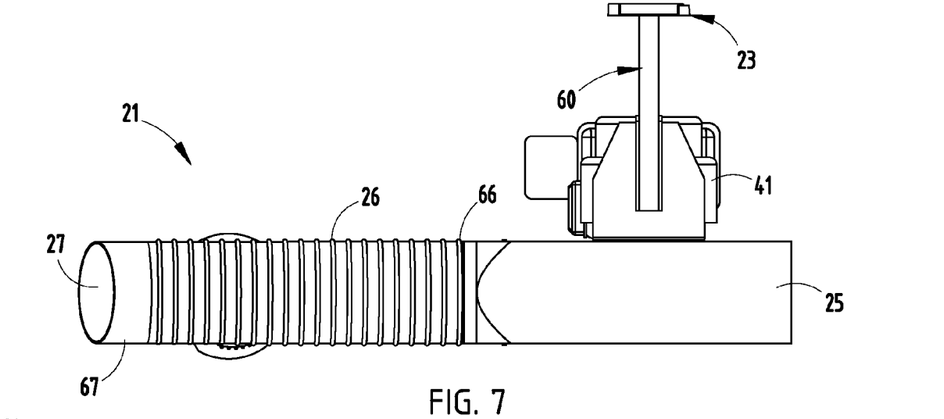

The blower assembly 21 (FIG. 5) is a self-contained system weighing about 100 lbs. It includes the blower unit 25 (including a housing/frame and internal rotatable multi-blade blower), a motor 41 for driving the blower unit 25, its own gas tank 42, and electrical and mechanical controls for operating the motor 41. The housing of the blower unit 25 defines an outlet to which the flexible hose 26 is attached.

Figure 4:
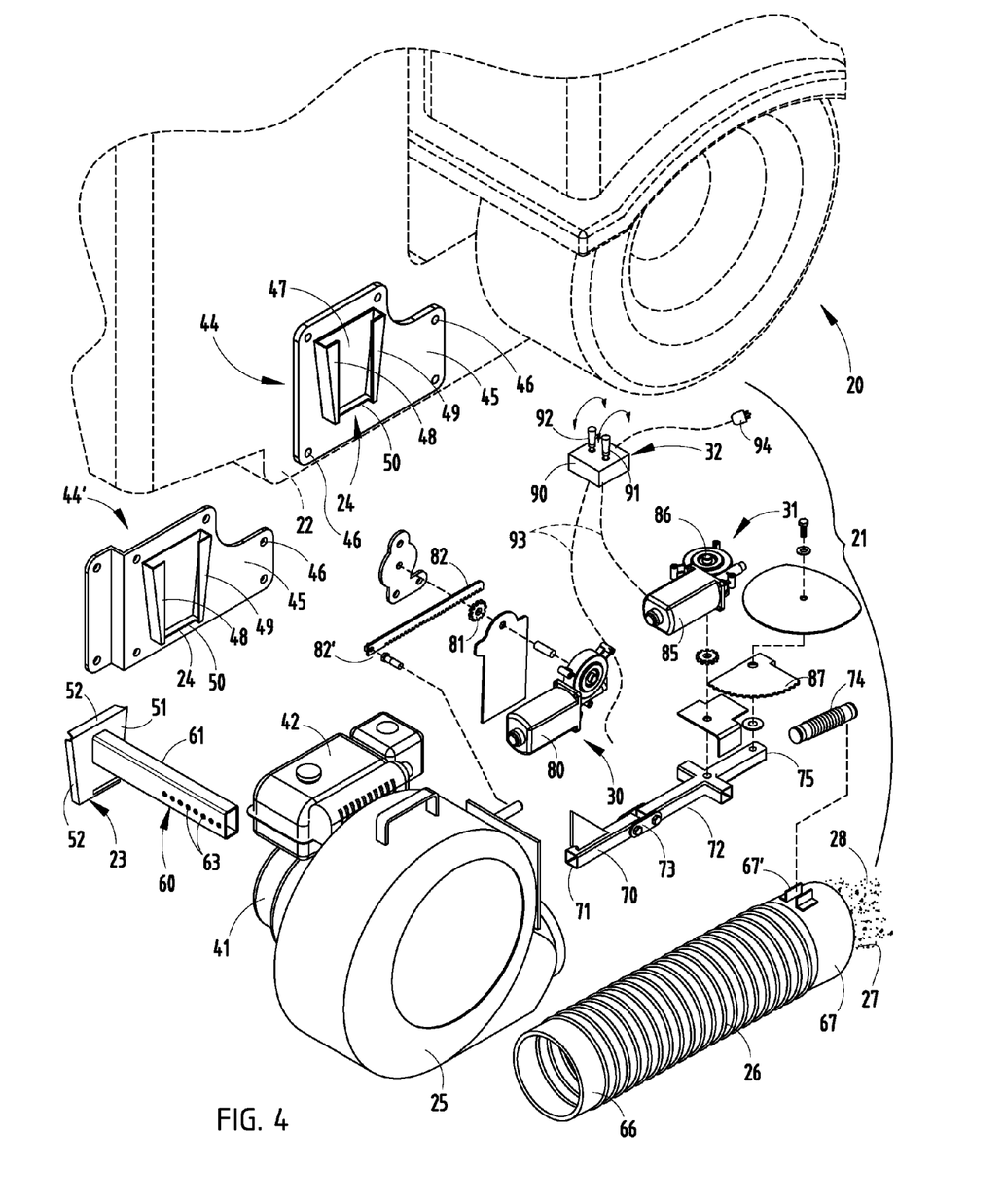
FIG. 4 is an exploded perspective view of the blower assembly.

A bracket 44 (FIG. 4) includes a plate 45 with fastener holes 46 designed for receiving screws for attachment to the lawnmower frame 22. The up-facing pocket connector 24 is attached to the plate 45 and includes a flat plate-like rear wall 47, L-shaped opposing flanges 48 and 49, and a bottom flange 50 that combine to define an upwardly-facing, upwardly-open pocket on its outer face. The pocket extends vertically, but the flanges 48 and 49 are angled toward each other to define a narrowing bottom shape that wedgingly engages the matingly shaped blade connector 23, with gravity further assisting and tightening the wedging/frictional engagement. The inner edges of the flanges 48 and 49 are spaced apart to define an open channel therebetween. Notably, different brackets, such as modified bracket 44' (FIG. 4), can be provided to allow attachment of the pocket connector 24 to the frames of different lawnmowers without interference from components on the particular lawnmowers.

The down-facing blade connector 23 (FIG. 4) includes a plate-like panel 51, and inwardly bent edge flanges 52 on all four sides. The flanges 52 combine to take up a depth of the pocket in pocket connector 24, and with the panel 51 taking up the fore-aft space within the pocket. A bottom of the blade connector 23 is narrow, which assists in guiding the blade connector 23 into an enlarged top end of the pocket connector 24. As the blade connector 23 is slid downwardly into the pocket connector 24, the blade connector 23 wedges in place to form a very secure and positive connection to the pocket connector 24, which is both frictionally and gravitationally retained.

Figure 8:
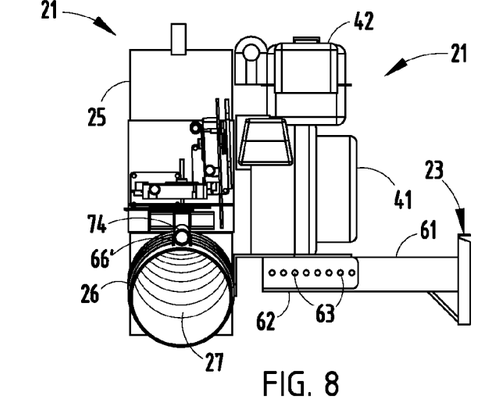
Figure 9:
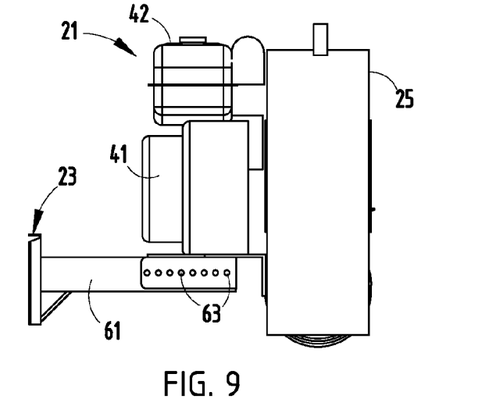
Figure 10:
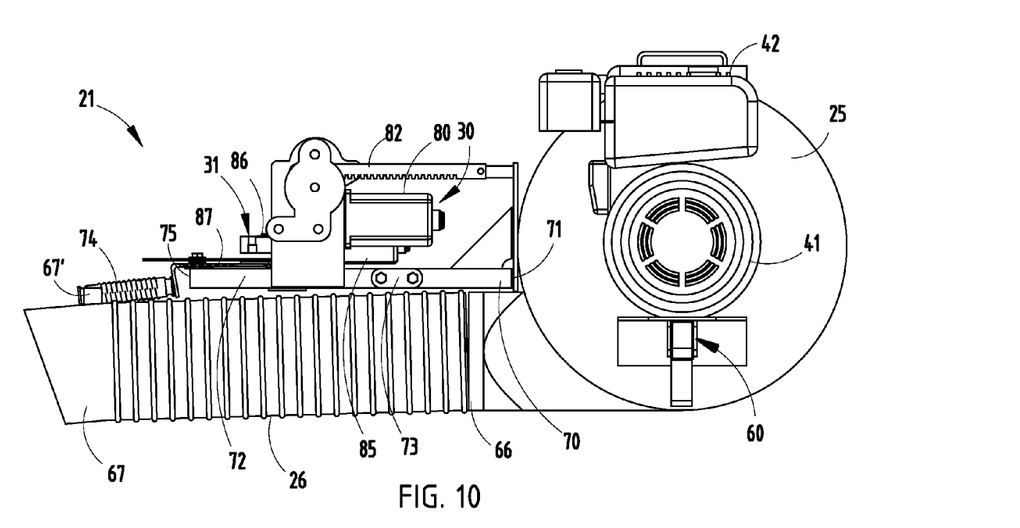
FIGS. 10-11 are right side (inside) and left side (outside) views of the blower assembly of FIG. 5.
Figure 11:
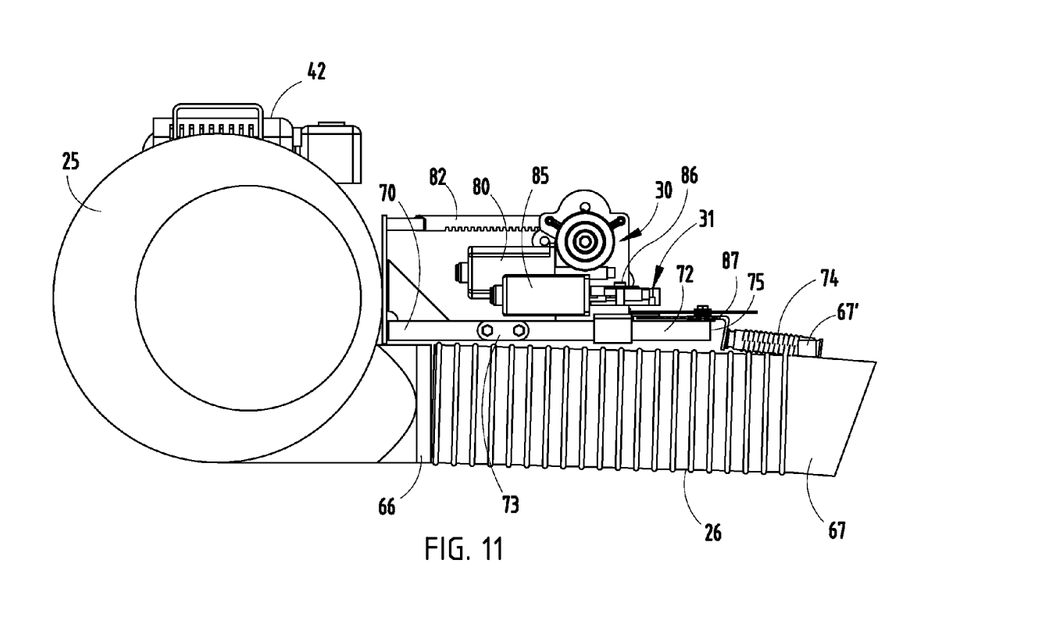
Figure 12:
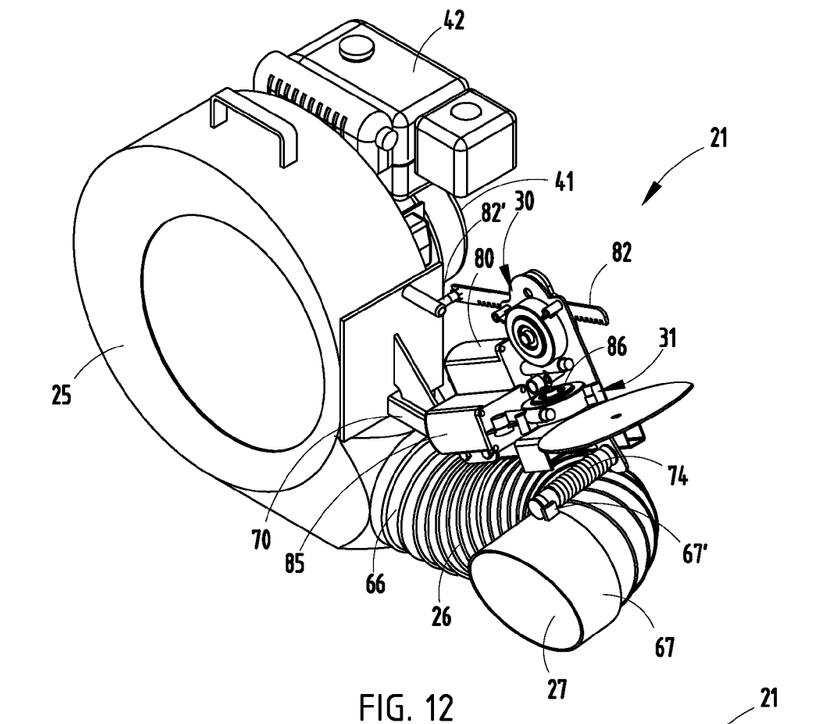
FIGS. 12-13 are perspective and left side views of the blower assembly, with an outlet of the flexible hose adjusted to face sharply toward the right.
Figure 13:
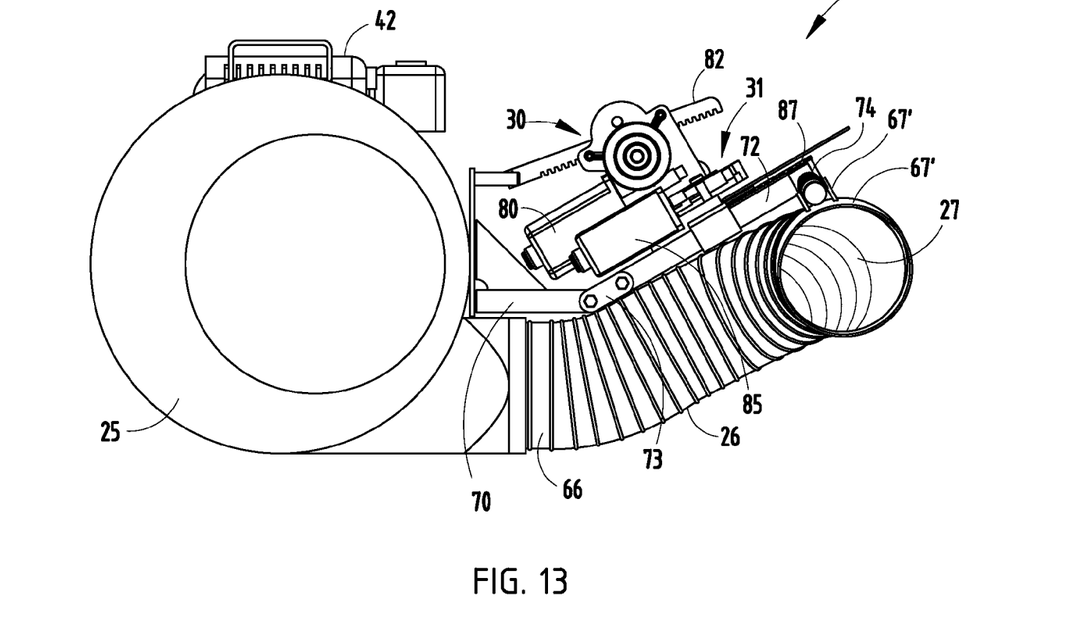
Figure 14:
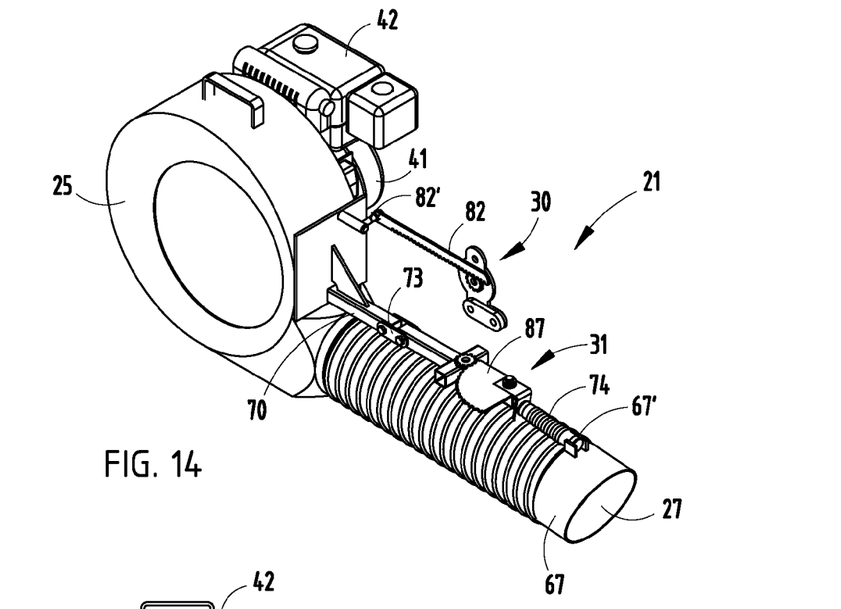
FIGS. 14-16 are perspective, left side and top views of the blower assembly, with the outlet of the flexible hose oriented in a linear forward direction, and noting that several components are removed to better show underlying components.

A telescopingly adjustable arm 60 (FIG. 4) extends laterally and perpendicularly from the blade connector 23. The arm 60 includes a square tube section 61 and a mating inverted U-shaped beam section 62 (FIG. 8). (The beam section 62 can also be tubular, if desired.) The tube section 61 is sized to fit between the inward edges of the flanges 48-49 on the pocket connector 24. The tube section 61 has a plurality of spaced holes 63, and beam section 62 has at least one fixing hole (and preferably two) for receiving a bolt extended through the fixing hole(s) and through selected one(s) of the spaced holes 63 for fixing a length of the arm 60. By this arrangement, the arm's length can be adjusted to a particular desired length most appropriate for the particular lawnmower 20 on which the blower assembly 21 is mounted. The beam section 62 is fixedly welded to the housing/frame of the blower unit 25 at end 64.

The flexible hose 26 (FIG. 4) includes a tube of plastic film, a spiral wire reinforcer winding spirally around the tube from end to end to keep the tube's open shape, a metal ring retainer 66 on an inner end for connection to the outlet of the blower unit 25, and a metal ring tip 67 fixed to an outer end of the tube.

A support for the hose 26 (FIG. 4) includes a first beam member 70 with an inner end 71 fixed to the housing/frame of the blower unit 40, a second beam member 72 pivoted to an outer end of the first beam member 70 at a horizontal pivot 73, and a third beam member 74 pivoted to an outer end of the second beam member 72 at a vertical pivot 75. An outer end of the third beam member 74 is pivotally attached to the outer ring tip 67 of the hose 26 at location 67'. A coil spring extends around the third beam member 74 and extends between the inner and outer ends of the third beam member 74. The coil spring is in compression, and combines with brackets on its inner end (generally located adjacent pivot 75) to cause it to bias the third beam member 74 (and hence the hose 26) toward a "centered" home position. The coil spring and third beam member 74 combine form a shock absorber so that, if something abuts the end of the hose 26 (e.g., the outer ring tip 67 catches as the lawnmower 20 drives by a tree or other obstruction), the coil spring and third beam member 74 flex to allow the tip 67 to move out of the way of the interfering object and then spring back toward its "centered" home position.

Figure 15:
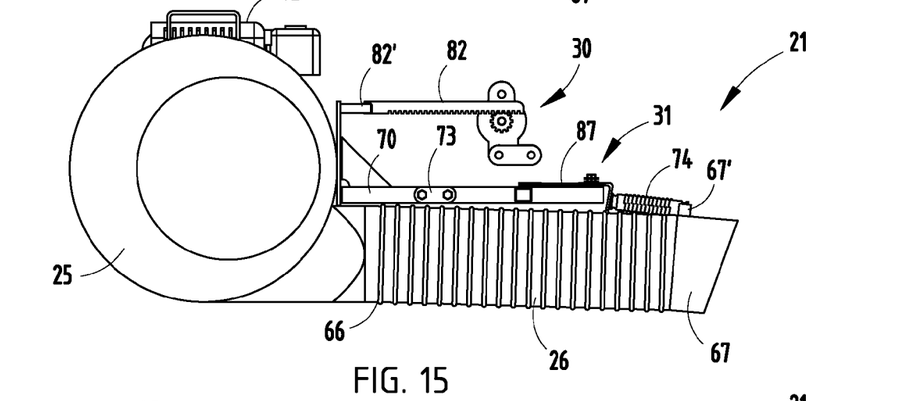
Figure 21:
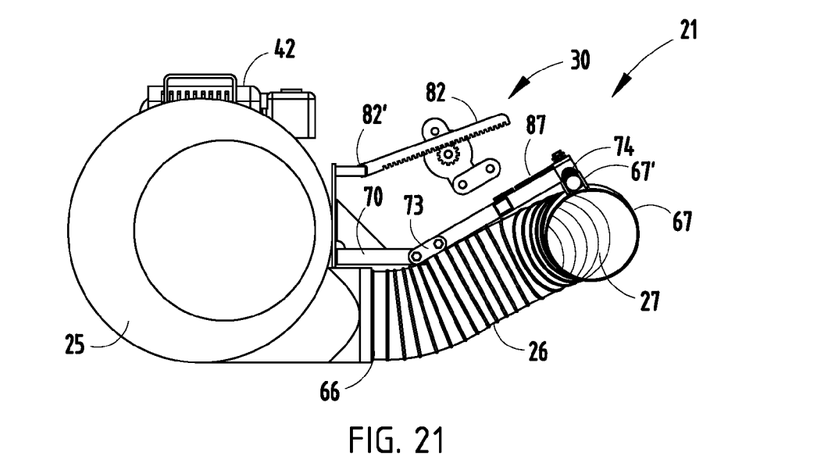
Figure 22:
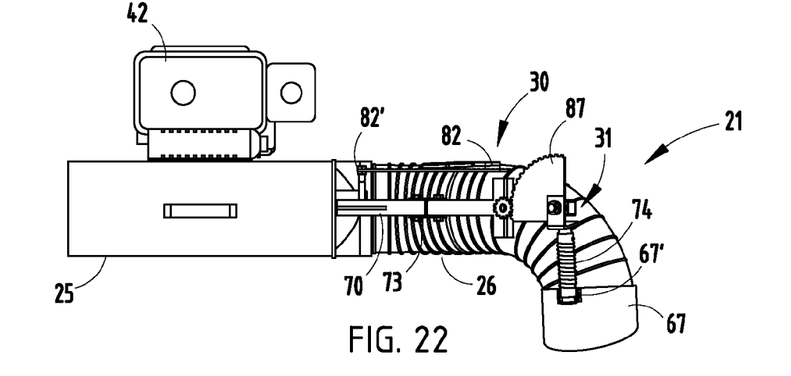

The actuator 30 (compare FIG. 15 and FIG. 21) controls vertical adjustment/orientation of the tip 67 of the hose 26. The actuator 30 (FIG. 4) includes a 12 v DC reversible motor 80, transmission, and pinion driving gear 81, and a linear rack 82 with gear teeth engaging the gear 81. The rack 82 is pivoted to the housing/frame of the blower unit 25 at location 82'. When the motor 80 is operated, the gear 81 walks along the rack 82 (see FIGS. 15 and 21), pulling on (or pushing on) and hence causing the second beam member 72 to pivot upwardly (or downwardly) about horizontal pivot 73, thus changing the vertical orientation of air stream 28 flowing out of the hose outlet.

Figure 16:
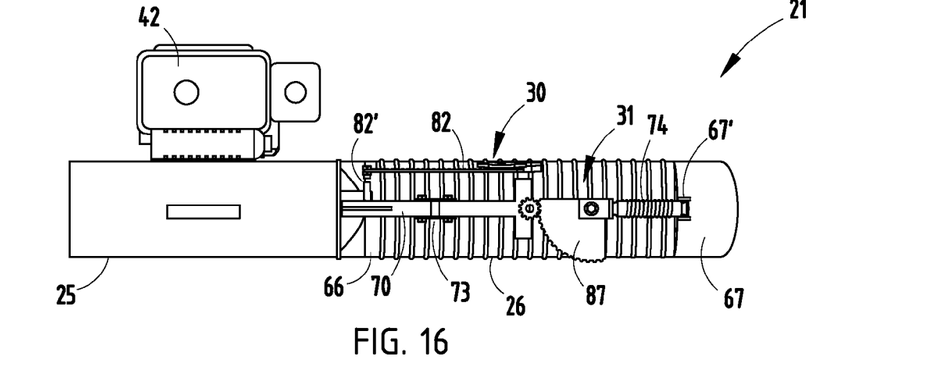
Figure 17:
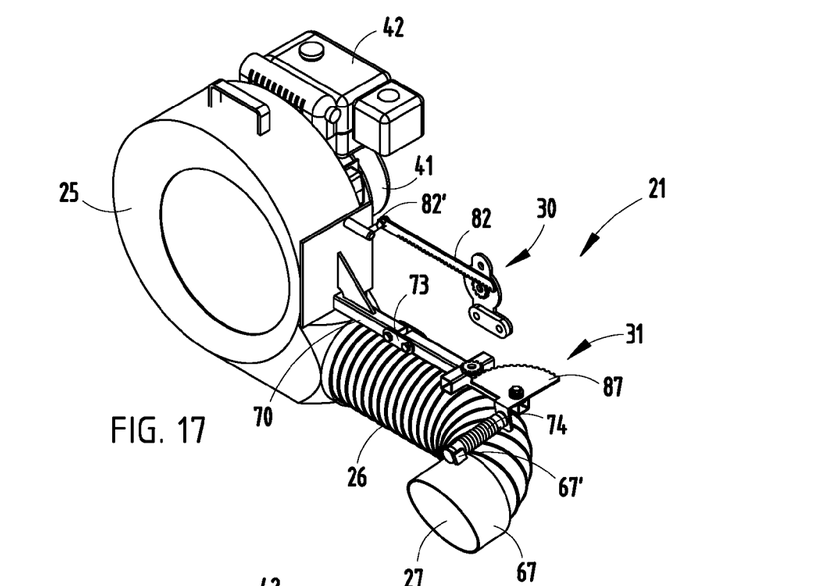
FIGS. 17-19 are perspective, left side and top views of the blower assembly, with the outlet of the flexible hose oriented in a sharp right-facing direction, and noting that several components are removed to better show underlying components.
Figure 18:
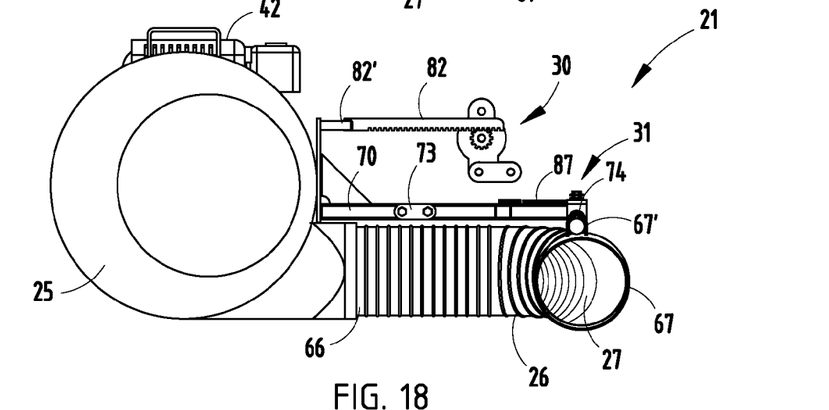
Figure 19:
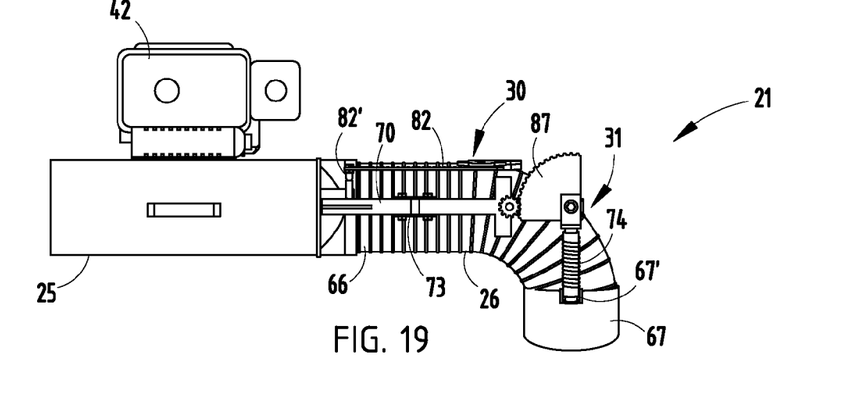
Figure 20:
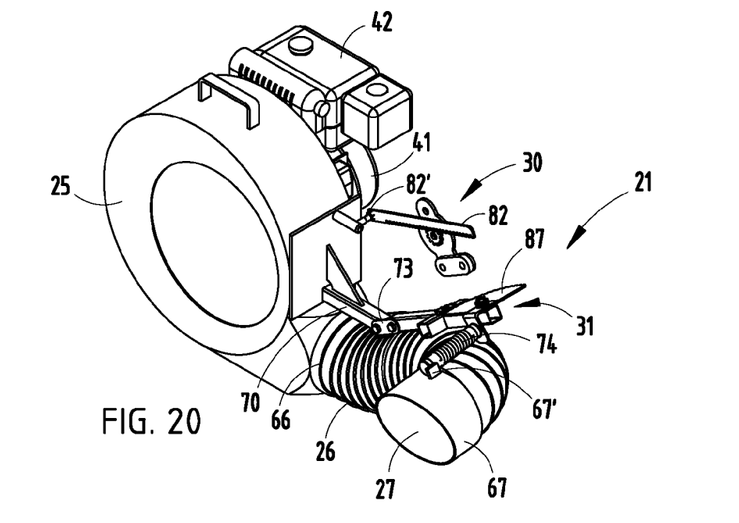
FIGS. 20-24 are perspective, left side and top views of the blower assembly, with the outlet of the flexible hose oriented in a sharp upward and right-facing direction, and noting that several components are removed to better show underlying components.

The actuator 31 (compare FIGS. 16 and 19) controls horizontal adjustment/orientation of the tip 67 of the hose 26. The actuator 31 (FIG. 4) includes a 12 v DC reversible motor 85, transmission, and pinion driving gear 86, and an arcuate rack 87 with gear teeth engaging the gear 86. The rack 87 is pivoted to the housing/frame of the blower unit 25. When the motor 85 is operated, the gear 86 walks along/around the rack 87, pulling on (or pushing on) and hence causing the third beam member 74 to pivot sideways (right or left) about vertical pivot 75, thus changing the horizontal orientation of air stream 28 flowing out of the hose outlet.

The control 32 (FIGS. 1 and 4) includes a modular unit with box-like housing 90 (FIG. 4), two switches 91 and 92, and electrical wires 93 with plug-in connectors 94 for connection to the lawnmower's (20) electrical system. Specifically, the illustrated connectors 94 plug into the electrical system of the lawnmower 20 for receiving electrical power. (Alternatively, it is contemplated that the switches 91 and 92 could be powered by electrical power from the blower unit 25, or from a separate battery.) The housing 90 attaches to a fender of the lawnmower 20 adjacent the seat of the lawnmower 20 for easy access by its operator. The switch 91 controls actuator 30 and hence vertical adjustment of the direction of the air hose 26, and the switch 92 controls the actuator 31 and hence horizontal adjustment of the direction of the air hose 26. It is contemplated that other switch arrangements can be used. For example, a single joystick could be used where side-to-side movement controls actuator 30 and hence sideways/horizontal adjustment of the orientation of the hose's outlet, and where fore-aft movement controls actuator 31 and hence vertical adjustment of the orientation of the hose's outlet.

Figure 23:
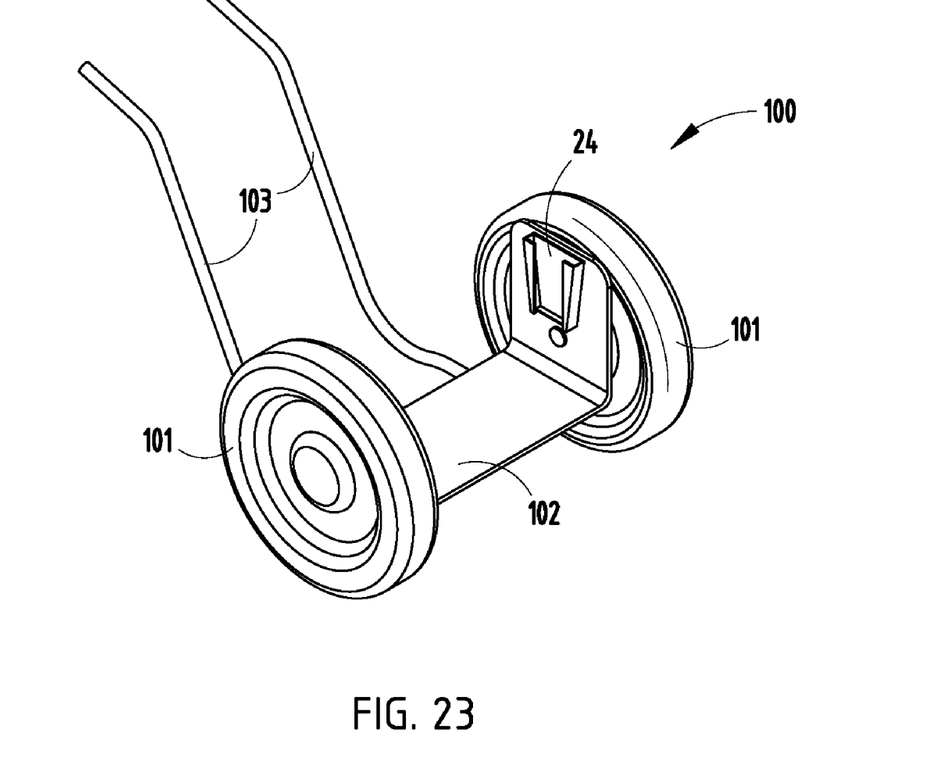
Figure 24:
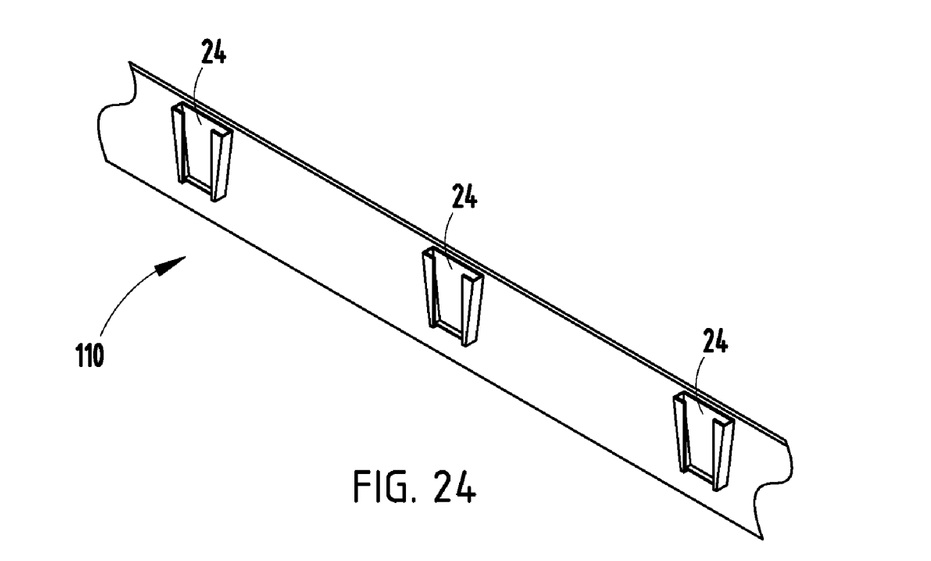

It is contemplated that the present blower assembly 21 can be quickly taken off of (released from) one lawnmower (20), by unplugging the control connectors 94 (or removing the control housing 90 from the lawnmower's fender) and then by lifting the blower assembly 21 upwardly to remove the blade connector 23 out of the pocket connector 24. All of this is accomplished without the need to manipulate mechanical fasteners to facilitate the release. The blower assembly 21 can then be attached to another wheeled unit (see manually-pushed frame 100 in FIG. 23, . . . which can be as simple as two wheels 101 supported on a frame 102 with a handle 103, and potentially also a battery) having a pocket connector 24 (see FIG. 23). Alternatively, the blower assembly 21 can be attached to a beam 110 mounted to a building wall (or trailer side) and having a plurality of pocket connectors 24 for holding the blower assembly(ies) 21 in a storage position (see FIG. 24), or for storage of the blower assembly 21 to a trailer (not shown) for storage and transport along with other lawnmowers until it is again needed.

The method includes providing a lawnmower and a second device (such as a second lawnmower, or wheeled device, or storage rack) each having a first connector, and providing a blower assembly having a second connector shaped to matably releasably engage the first connector. The method includes removing the blower assembly from the lawnmower by disconnecting the second connector from the first connector on the lawnmower by simply lifting the blower assembly and by disconnecting electrical connectors as needed, and then re-attaching the blower assembly to the second device by connecting the second connector with the first connector on the second device.

To summarize, a lawn care apparatus includes a self-powered wheeled vehicle having a frame, and a blower assembly attached to the frame. The blower assembly includes a blower unit, a flexible hose with an outlet for emitting a directed flow of air from the blower unit, adjustment structure configured to support the flexible hose in different vertical and horizontal positions and orientations, and at least one powered actuator operably connected to the adjustment structure to selectively bend the flexible hose. A control is operably connected to the at least one actuator, the control having different positions for automatically operating the at least one actuator to move the outlet to a selected one of the positions and orientations.

In narrower forms, the control includes two switches (e.g., one up/down, one right/left switch), two actuators (up/down and right/left), powered adjustment (e.g., a pivot, linear rack of teeth, powered pinion gear, or pivot, arcuate rack of teeth, powered pinion), and is self-contained including pluggable electrical connections. Also, the flexible hose is supported by structure including shock absorber, is movable to different positions include straight sideways, straight forward. The blower assembly includes detachable mounting structure, releasably engageable without use of separate fasteners, and which includes connectors that wedgingly vertically engage, and which is supported by a telescopingly extendable arm for adjustable width positioning.

Also, a lawn care apparatus is provided that includes a wheeled vehicle having a main frame, a blower assembly including a subframe, and a mounting system. The mounting system includes a vertically-facing female connector on one of the main frame and subframe, and a vertically-facing male on the other of the main frame and the subframe. The female and male connectors include matingly angled side edges that frictionally and stably engage to hold the blower assembly in a fixed position on the wheeled vehicle.

Also, a blower apparatus is provided that is adapted for attachment to a lawn care apparatus. The blower apparatus includes a blower assembly having a blower unit with a subframe, a flexible hose with an outlet for emitting a directed flow of air from the blower unit, adjustment structure configured to support the flexible hose in different vertical and horizontal positions and orientations relative to the subframe, and at least one powered actuator operably connected to the adjustment structure to selectively bend the flexible hose. A control is operably connected to the at least one actuator. The control has different positions for automatically operating the at least one actuator to move the outlet to a selected one of the positions and orientations.

Also, a method is provided that includes providing a lawnmower and a second wheeled device each having a first connector, and providing a blower assembly having a second connector shaped to matably releasably engage the first connector. The method includes removing the blower assembly from the lawnmower by disconnecting the second connector from the first connector on the lawnmower, and re-attaching the blower assembly to the wheeled device by connecting the second connector with the first connector on the wheeled device.

It is to be understood that variations and modifications can be made on the aforementioned structure without departing from the concepts of the present invention, and further it is to be understood that such concepts are intended to be covered by the following claims unless these claims by their language expressly state otherwise.

The embodiments of the invention in which an exclusive property or privilege is claimed are defined as follows:

1. A lawn care apparatus comprising:
   a self-powered wheeled vehicle having a frame;
   a blower assembly attached to the frame, the blower assembly including a blower unit, a flexible hose with an outlet for emitting a directed flow of air from the blower unit, adjustment structure configured to support the flexible hose in different vertical and horizontal positions and orientations, and at least one powered actuator operably connected to the adjustment structure to selectively bend the flexible hose; and
   a control operably connected to the at least one powered actuator, the control having different positions for automatically operating the at least one powered actuator to move the outlet to a selected one of the positions and orientations;
   wherein the at least one powered actuator includes a first actuator for vertical adjustment and wherein the adjustment structure supports the hose for flexing about a first pivot while the first actuator operates, the first actuator including a linear rack of teeth and a first pinion operably engaging the linear rack;
   wherein the at least one powered actuator includes a second actuator for horizontal adjustment and wherein the adjustment structure supports the hose for flexing about a second pivot while the second actuator operates, the second actuator including an arcuate rack of teeth and a second pinion operably engaging the arcuate rack.

2. The apparatus of claim 1, wherein the control includes at least one switch for controlling operation of at least one of the first and second powered actuators.

3. The apparatus of claim 1, wherein the wheeled vehicle and blower assembly include separate motors.

4. The apparatus of claim 1, wherein the adjustment structure includes a shock absorber so that when an end of the hose strikes an object, the shock absorber absorbs a shock of the strike and the hose is allowed to temporarily flex out of the way.

5. The apparatus of claim 1, wherein the vertical adjustment includes at least 45 degrees of vertical angle adjustment.

6. The apparatus of claim 1, wherein the control and actuators are electrically operated.

7. The apparatus of claim 1, wherein the control includes an electrical connector plug for connecting to a mating plug on the lawnmower.

8. The apparatus of claim 1, including detachable mounting structure on the lawnmower and mating structure on the blower assembly.

9. The apparatus of claim 8, wherein the detachable mounting structure includes mating male and female connectors that engage to hold the blower assembly on the lawnmower without use of separate fasteners.

10. The apparatus of claim 8, wherein the detachable mounting structure includes vertically engaging connectors that wedgingly engage upon lowering the blower assembly relative to the lawnmower.

11. The apparatus of claim 8, wherein the detachable mounting structure includes a female connector forming an up-facing pocket, and a male connector forming a down-facing blade shaped to wedgingly engage the pocket.

12. The apparatus of claim 11, wherein the pocket has a back flange, side flanges, and lip flanges extending from the side flanges, the side flanges being opposite each other and spaced from the back flange to create the pocket.

13. The apparatus of claim 11, wherein the blade is generally flat and includes a wider top edge and narrower bottom edge, and further includes edge flanges that stiffen the blade.

14. The apparatus of claim 8, wherein the mating structure on the blower assembly includes a blade and an arm that extends horizontally from the blade to a frame on the blower assembly.

15. The apparatus of claim 14, wherein the arm is adjustable in length.

16. The apparatus of claim 1, wherein
   the blower assembly includes a subframe; and
   Including a mounting system including a laterally-facing female connector on one of the frame and subframe and a laterally-facing male on the other of the frame and the subframe, the female and male connectors including mating side edges that stably engage to hold the blower assembly in a fixed position on the wheeled vehicle.

17. The apparatus of claim 16, wherein the male connector and the female connector securely engage without the need for separate fasteners.

18. The apparatus of claim 16, wherein the female connector forms an upwardly-facing pocket, and the male connector forms a down-facing spade-like blade.

19. The apparatus of claim 18, wherein the pocket includes a back flange, side flanges, and lip flanges extending from the side flanges and spaced from the back flange.

20. The apparatus of claim 18, wherein the blade includes a flat portion and includes edge flanges extending from edges of the flat portion and extending at an angle to vertical.

21. The apparatus of claim 18, including an arm extending horizontally from the connector on the blower assembly.

22. The apparatus of claim 21, wherein the arm is telescopingly extendable to adjust a length of the arm.

23. The apparatus of claim 16, including a hose on the blower assembly and a control for controlling the actuators to automatically change an orientation of an outlet of the hose.

24. The apparatus of claim 23, including a control for controlling the actuators.

25. A blower apparatus adapted for attachment to a lawn care apparatus, comprising:

a blower assembly including a blower unit with a subframe, a flexible hose with an outlet for emitting a directed flow of air from the blower unit, adjustment structure configured to support the flexible hose in different vertical and horizontal positions and orientations relative to the subframe, and first and second powered actuators operably connected to the adjustment structure to selectively bend the flexible hose, the first actuator including a first rack and pinion for adjusting the flexible hose between the different vertical positions and orientations, and the second actuator including a second rack and pinion for adjusting the flexible hose between the different horizontal positions and orientations; and a control operably connected to the first and second powered actuators, the control having different positions for automatically operating the first and second powered actuators to move the outlet to a selected one of the positions and orientations.

* * * * *